March 15, 1932. S. J. POPLAWSKI 1,849,112
FRUIT JUICE EXTRACTOR
Filed Sept. 10, 1928 2 Sheets-Sheet 2
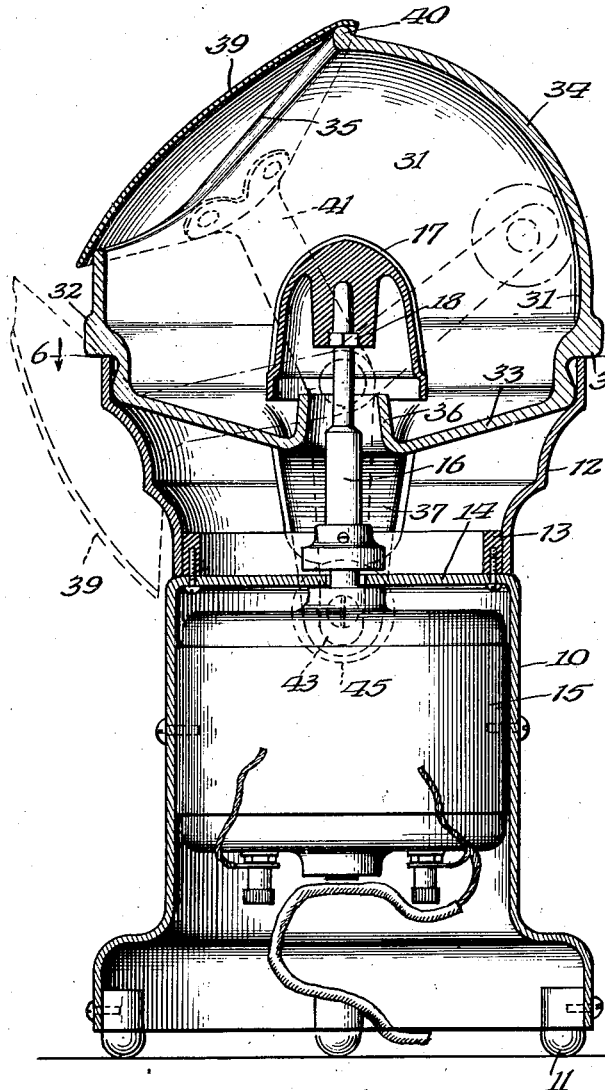
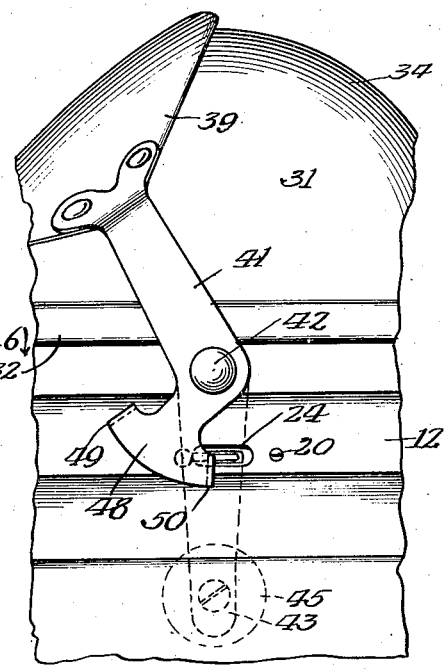
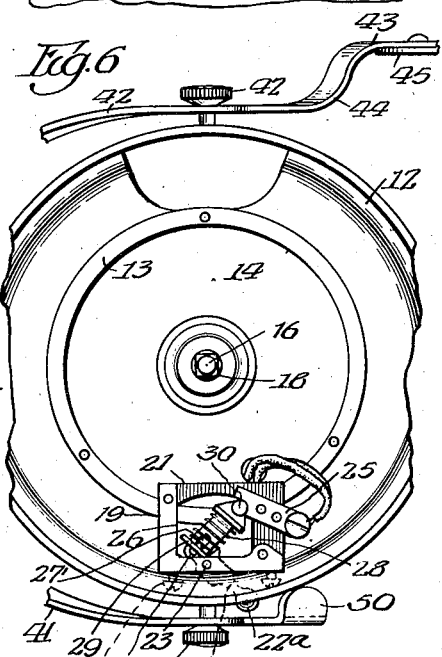
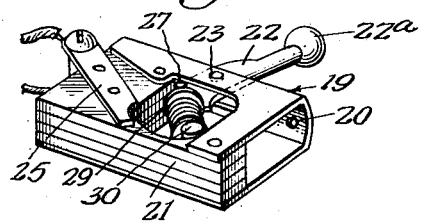
Inventor
Stephen J. Poplawski
By Fred Gerlach Atty.

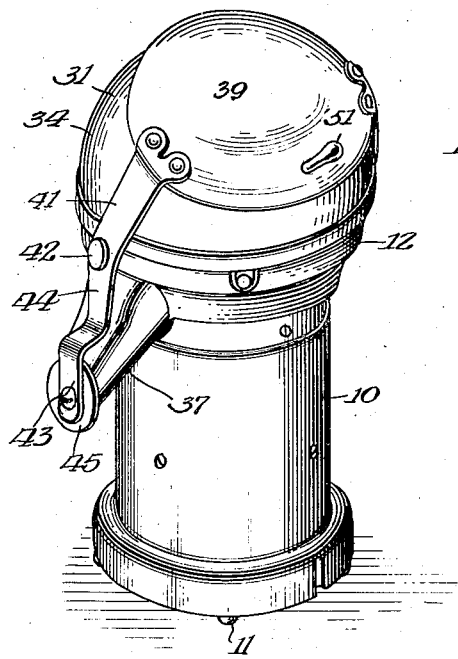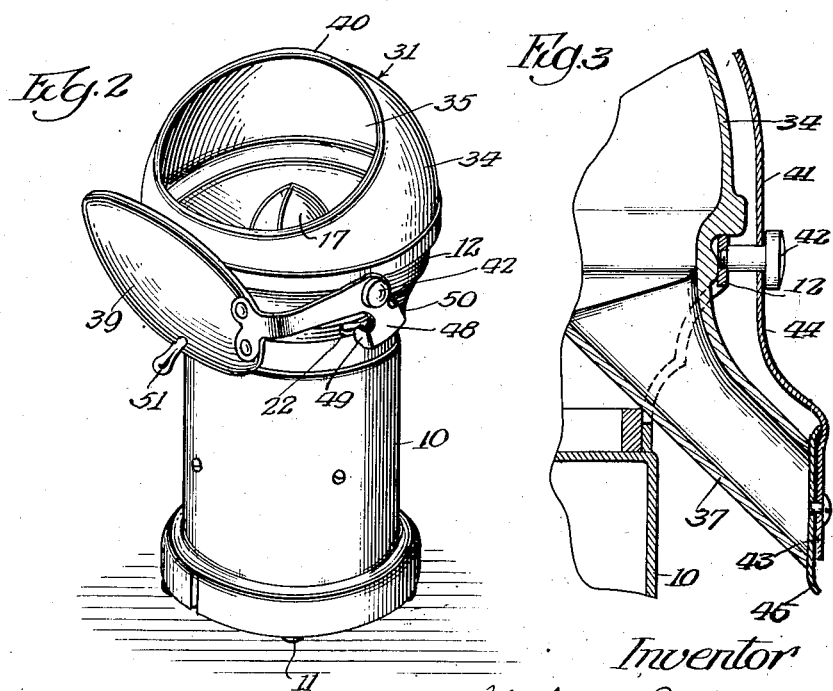

Patented Mar. 15, 1932

1,849,112

UNITED STATES PATENT OFFICE

STEPHEN J. POPLAWSKI, OF RACINE, WISCONSIN, ASSIGNOR TO HAMILTON BEACH MANUFACTURING COMPANY, OF RACINE, WISCONSIN, A CORPORATION OF WISCONSIN

FRUIT JUICE EXTRACTOR

Application filed September 10, 1928. Serial No. 305,021.

The invention relates to juice extractors for citrus and other fruits of the type in which a rotary bulb or head is used to remove the pulp and juice from the rind while the latter is held against rotation.

In motor driven juice extractors of this type now in use, the bowl around the extractor head has an opening therein for the manual insertion and removal of the fruit, and to permit the operator's hand to hold the fruit during the extracting operation. An objection incident to the use of this type of extractor is that the opening remains uncovered so that insects and impurities may enter the bowl, thus rendering the device unsanitary.

One object of the invention is to provide an improved extractor of this type in which the opening is kept normally closed to prevent the entry of insects and impurities while the extractor is not in use.

Another object of the invention is to provide an extractor of this type in which the discharge spout for the juice leading from the bowl will also be kept closed to exclude insects and dust when the extractor is not in use. Another object of the invention is to provide an extractor of this type in which the bowl will be kept normally closed and in which the manipulation of the cover will automatically control the operation of the mechanism for driving the extractor head. By this provision the opening of the cover will automatically start the driving mechanism and its closing will automatically stop the driving mechanism.

Another object of the invention is to provide a juice extractor of the character under consideration in which the cover or closure for the spout is so arranged that during opening thereof the control means is rendered operative to start drive of the extractor head.

Other objects of the invention will be apparent from a consideration of the following detailed description.

The invention consists in the several novel features hereinafter set forth and more particularly defined by claims at the conclusion hereof.

In the drawings: Fig. 1 is a perspective illustrating a fruit juice extractor embodying the invention in its inoperative position. Fig. 2 is a perspective showing the cover for the bowl open and the extractor-head operative. Fig. 3 is a transverse section through the discharge spout and its closure. Fig. 4 is a central vertical section. Fig. 5 is a partial side view illustrating the arm on the cover for operating the motor-switch. Fig. 6 is a section taken on line 6—6 of Fig. 4. Fig. 7 is a perspective of the motor switch.

The invention is exemplified in an extractor which embodies a hollow supporting structure comprising a base 10 provided with feet 11 so it may rest on a table, counter, or shelf, and an upper annular member 12 which is removably secured by screws to a ring 13 screwed to the top wall 14 of the base 10. An electric motor 15 is housed in base 10 and is provided with an upwardly extending shaft 16. A ribbed head 17, adapted to rotate in the fruit to remove the pulp and juice, is removably held on the upper end of the shaft, and is recessed to receive a polygonal portion 18 of said shaft, so that the head will be rotated by the motor. A switch for controlling the motor comprises, a stamped frame 19 which is secured by screws 20 to the annular member 12, a block 21 of insulating material fixed in said frame, a lever 22 pivoted, as at 23, in said frame and extending outwardly through a slot 24 in member 12, a contact 25 connected to the windings of the motor and a member 26 which is pivotally and slidably confined in an opening in frame 19. Lever 22 carries a pin 27 which passes through a slot 27' in member 26. Pin 27 bears against a washer 29 which is engaged by a spring 28 coiled around member 26. A contact 30 on member 36 is adapted to engage fixed contact 25. The pin 27 on lever 22, working in slot 27', as the lever is swung, will pivotally move said member about contact 30 until a shoulder on said member causes it to be positioned so spring 28 will snap it into its alternative position. Reverse movement of the lever causes member 30 to be snapped to its other alternative position.

One of the line conductors is connected to the frame 25 so that when contacts 30 and 25 are in engagement, the circuit in the motor will be closed to cause it to operate. When in its other position, lever 22 will hold contact 30 away from contact 25 to open the circuit and stop the motor.

A bowl 31, usually of vitreous material, has a flange 32 resting on the rim of member 12, an inwardly sloping bottom wall 33 and a hemispherical top 34 which has an opening 35 in the side thereof, so that the operator may reach into the bowl with the fruit and hold it on the rotating head 17 to extract the juice. The bowl is also provided with a flange 36 around shaft 16 and with a downwardly sloping discharge spout 37 to deliver the extracted juice from the bowl into a vessel held in any suitable manner at the front of the base 10.

A cover 39, preferably of sheet metal, is formed to fit over opening 35 and to snugly seat on the margin 40 of opening 35. Cover 39 is secured to arms 41 which extend downwardly around the bowl and are pivotally supported from member 12 by screws 42 which are coaxial. The axis of these screws is disposed so that the margin of the cover 39 will swing onto the seat 40 of the bowl to form a comparatively tight joint and to swing away therefrom when the cover is swung downwardly. One of the arms 41 is extended downwardly below pivot 42 to form an arm 44 for supporting a disk 43 for closing the end of spout 37. The cover supporting arms are formed of metal which is slightly resilient so that arm 44 will press disk 43 against the end of spout 37 to form a tight closure. Disk 43 is convex, as at 45, so that it will slide into and out of engagement with the spout when the disk is swung substantially in its plane. The other arm 41 is extended to form an arm 48 which is provided with inturned lugs 49 and 50 which are extended into the vertical plane of the spherical end 22ª of switch-lever 22. When the cover 39 is shifted downwardly, lug 49 will shift lever 22 into position to close the motor circuit, and when the cover is swung into closed position, lug 50 will shift the switch-lever 22 to open the switch and automatically stop the motor. A handle 51 may be provided on the cover.

Normally, the cover 39 will be in its closed position to close the opening 35 in the bowl, and disk 43 will close the end of the discharge spout, so that when the extractor is not in use, insects and impurities will be excluded from the bowl. When juice is to be extracted from a section of fruit, the operator will grasp handle 41 and move it downwardly, which will swing cover 39 to expose the opening 35 in the bowl and will simultaneously swing closure disk 43 away from the spout. Simultaneously the lug 49 will shift switch-lever 22 to close the motor circuit and start the motor so the head 17 will be rotated. The operator will then insert a setcion of the fruit and hold it on the rotating head until the juice has been extracted therefrom. The juice will be discharged through spout 37 into a receptacle. When the extracting operation has been completed, the operator will withdraw the section of fruit and his hand from the bowl, and lift the handle 51 which will simultaneously shift cover 39 over opening 35 to close the bowl, shift disk 43 into position to close the end of spout 37, and lug 50 into position to operate lever 22 to open the motor circuit.

The invention exemplifies an improved fruit juice extractor in which the opening in the bowl for the insertion and removal of the fruit will be normally closed to exclude dirt and insects and to keep the bowl sanitary; also an extractor in which the discharge spout will be kept closed for the same purpose; also one in which the opening and closing of the cover for the opening in the bowl and the closure for the spout will automatically control the operation of the electric motor for driving the extractor head.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fruit juice extractor, the combination of a bowl provided with an opening for the insertion and removal of the fruit, and with a discharge spout, means for closing said opening and said spout, a head mounted rotatably in the bowl and adapted to have the fruit placed there-against for juice extracting purposes, driving means for the head, and means, operable by shift of the closing-means into and out of its operative position, for controlling the operation of the driving means.

2. In a fruit juice extractor, the combination of a bowl having a discharge spout, a cover for said spout, a head mounted rotatably in the bowl and adapted to have the fruit placed there-against for fruit extracting purposes, an electric motor connected to drive the head, a switch for controlling the motor, and means operative to close the switch when the cover is shifted into its open position and to open the switch when the cover is shifted into its closed position.

3. In a fruit juice extractor, the combination of a bowl provided with an opening for the insertion and removal of the fruit, and with a discharge spout, means for closing said opening and said spout, a rotary juice extracting head in the bowl, an electric motor connected to drive the head, and a switch for controlling the motor, operable by the closing-means.

4. In a fruit juice extractor, the combination of a bowl provided with an opening for the insertion and removal of the fruit, and with a discharge spout for the juice, a rotary juice extracting head in the bowl, driving means for the head, and conjointly operable covering means for the opening and the spout.

5. In a fruit juice extractor, the combination of a bowl provided with an opening for the insertion and removal of the fruit, and with a discharge spout for the juice, a rotary juice extracting head in the bowl, driving means for the head, and covers for said opening and spout, mounted to swing conjointly into and out of closing position.

6. In a fruit juice extractor, the combination of a bowl provided with an opening for the insertion and removal of the fruit, and with a discharge spout for the juice, a rotary juice extracting head in the bowl, driving means for the head, and a cover for the spout, mounted to swing transversely of the spout and to engage it yieldingly.

7. In a fruit juice extractor, the combination of a bowl provided with an opening for the insertion and removal of the fruit, and with a discharge spout for the juice, a rotary juice extracting head in the bowl, driving means for the extractor head, a resilient pivotally supported arm, and a cover for engaging the discharge end of the spout mounted on the arm.

8. In a fruit juice extractor, the combination of a bowl provided with an opening for the insertion and removal of the fruit, and with a discharge spout for the juice, a rotary juice extracting head in the bowl, driving means for the extractor head, and a yieldingly supported cover having a convex face for engaging the discharge end of the spout.

9. In a fruit juice extractor, the combination of a bowl having a hemispherical top with a hand-opening in one side thereof, and a discharge spout, a rotary juice extracting head in the bowl, means for driving said head, a cover for said opening, a cover for said spout, and pivoted arms fixed to the covers, to support them so they can be conjointly swung into and out of their closed position.

10. In a fruit juice extractor, the combination of a bowl provided with an opening for the insertion and removal of fruit, and with a discharge spout, a rotary juice extracting head in the bowl, a hollow base below the bowl, an electric motor in the base connected to drive the head, a motor-switch in the base, covers for said opening and spout, and means, operable by shift of said covers into and out of their operative position for controlling the switch.

11. In a fruit juice extractor, the combination of a bowl having a hemispherical top with a hand-opening in one side thereof, a rotary juice extracting head in the bowl, a hollow supporting base, an electric motor in said base and connected to drive the head, a switch for the motor, a cover for the opening, arms on opposite sides of the bowl, for pivotally supporting the cover, and means on one of said arms connected to close the switch when the cover is swung into its open position and to open the switch when the cover is swung into its closed position.

12. In a fruit juice extractor, the combination of a bowl having a hemispherical top with a hand-opening in one side thereof and a discharge spout, a rotary juice extracting head in the bowl, a hollow supporting base, an electric motor in said base and connected to drive the extractor head, a switch for the motor, covers for the opening and the spout, and arms pivoted on opposite sides of the bowl for pivotally supporting the covers so that they are shiftable conjointly into and out of their closed position.

13. In a fruit juice extractor, the combination of a bowl having a hemispherical top with a hand-opening in one side thereof and a discharge spout, a rotary juice extracting head in the bowl, a hollow supporting base, an electric motor in said base and connected to drive the head, a switch for the motor, covers for the opening and the spout, and arms pivoted on opposite sides of the bowl for pivotally supporting the covers so that they are shiftable conjointly into and out of their closed position, one of the arms having means for shifting the switch.

Signed at Racine, Wisconsin, this 6th day of September, 1928.

STEPHEN J. POPLAWSKI.